United States Patent
Hsu

(10) Patent No.: US 8,266,762 B2
(45) Date of Patent: Sep. 18, 2012

(54) BLOWER

(75) Inventor: WenYi Hsu, Tokyo (JP)

(73) Assignee: Kyodo Co., Ltd., Tokyo (JP)

( * ) Notice: Subject to any disclaimer, the term of this patent is extended or adjusted under 35 U.S.C. 154(b) by 466 days.

(21) Appl. No.: 12/507,538

(22) Filed: Jul. 22, 2009

(65) Prior Publication Data

US 2010/0018000 A1 Jan. 28, 2010

(30) Foreign Application Priority Data

Jul. 22, 2008 (JP) .................. 2008-188356

(51) Int. Cl.
*A47L 5/00* (2006.01)
*A47L 5/24* (2006.01)
(52) U.S. Cl. ............. 15/327.5; 15/344; 15/405
(58) Field of Classification Search .......... 15/327.5, 15/344, 405; *A47L 5/00, 5/24*
See application file for complete search history.

(56) References Cited

U.S. PATENT DOCUMENTS

| | | | |
|---|---|---|---|
| 5,768,749 A | 6/1998 | Ohi et al. | |
| 6,105,206 A | 8/2000 | Tokumaru et al. | |
| 6,116,864 A | 9/2000 | Veser et al. | |
| 7,382,104 B2* | 6/2008 | Jacobson et al. | 318/276 |
| 2004/0216262 A1 | 11/2004 | Taomo et al. | |

FOREIGN PATENT DOCUMENTS

| | | |
|---|---|---|
| CN | 101634309 | 1/2010 |
| EP | 2147591 | 8/2010 |
| JP | 2002-257097 | 9/2002 |
| JP | 2004-076611 | 3/2004 |
| JP | 2007-289040 | 4/2006 |
| JP | 2010-025008 | 2/2010 |
| WO | WO-97/33461 | 9/1997 |

OTHER PUBLICATIONS

Office Action dated May 2, 2011 for Korean Patent Application No. 10-2009-0060663 5 pages.
European Search Report for European Application No. EP 09163930 dated Jul. 20, 2010.
Office Action dated Oct. 19, 2011 for Chinese Patent Application No. 200910152042.6, 6 pages.

* cited by examiner

*Primary Examiner* — David Redding
(74) *Attorney, Agent, or Firm* — Patterson Thuente Christensen Pedersen, P.A.

(57) ABSTRACT

In a blower, an engine is carried on the back, and a blower portion having a fan is held through a holding member by hand. One end of a flexible shaft, is connected to an output shaft of the engine and the other end of which is connected to a rotary shaft of the fan. The flexible shaft has a flexible outer tube for connecting a casing of the engine with a housing of the fan, and a rotary shaft formed of a helical coil rounded helically around the axial line of the outer tube and extending axially in the outer tube, one end of the rotary shaft being connected to the output shaft of the engine and the other end of the rotary shaft of the flexible shaft being connected to the rotary shaft of the fan. The rotary shaft of the flexible shaft is connected to the rotary shaft of the fan through a power transmitting direction varying device.

1 Claim, 4 Drawing Sheets

BLOWER

RELATED APPLICATION

The present application claims priority to Japanese Application No. 188356/2008 filed Jul. 22, 2008, which is incorporated herein in its entirety by reference.

BACKGROUND OF THE INVENTION

1. Field of the Invention

The present invention relates generally to a blower and, more particularly, to a blower wherein an engine thereof is carried on the back and a blower portion thereof is held by hand.

2. Description of the Related Art

The conventional engine blower can be classified roughly to a type wherein an engine and a blower portion are carried on the back as shown in FIG. 5, and disclosed in the Japanese Patent Application Laid-Open No. 257097-2002, a type wherein an engine and blower portion are held by hand as shown in FIG. 6, and a type wherein a blower portion is attached on a tip end of a bush cutter instead of a cutter of the bush cutter.

In FIG. 5, reference numeral 1 denotes a conventional blower of the type to be carried on the back, reference numeral 2 denotes an L-shaped shoulder member to be carried on the back, reference numeral 3 denotes a shoulder belt, reference numeral 4 denotes a blower portion, reference numeral 5 denotes a casing of the blower portion 4, reference numeral 6 denotes an air exhaust port of the blower portion 4, reference numeral 7 denotes an engine for driving the blower portion 4, reference numeral 8 denotes a fuel tank, reference numeral 9 denotes a flexible tube such as a bellows type tube, reference numeral 10 denotes an elongated air ejection pipe, and reference numeral 11 denotes a handle attached to the air ejection pipe 10 for holding the air ejection pipe 10 by hand.

In such a conventional blower 1, of the type wherein the engine and the blower portion are carried on the back, the engine 7 and the blower portion 4 are connected as a unit and carried on the back, so that a large engine of about 10 Kg, 100 cc can be used. Further, only the air ejection pipe 10 connected to the blower portion 4 is held by hand, so that the blower 1 can easily be handled.

In the conventional blower of the type, wherein the engine and the blower portion are carried on the back as mentioned above, however, a heavy weight due to the engine 7 and the blower portion 4 is applied on the back. Further, the air ejection pipe 10 is connected to the blower portion 4 carried on the back through the bellows type flexible tube 9 and the power of ejection air is reduced in the bellows type flexible tube 9, so that the length of the flexible tube 9 is limited, and the operational range of the blower 1 becomes small.

In the hand type blower shown in FIG. 6, the engine 7 and the blower portion 4 are formed as a unit and held by hand, so that it is impossible to handle over a long time, if the total weight of the blower is larger than about 5 Kg, and as a result the engine 7 is limited in power to 20 cc class. The operability is lower than that of the blower of the type, wherein the engine and the blower portion are carried on the back because the total weight to be held by hand becomes large remarkably.

In the attachment type bush cutter, wherein a cutter 13 is removed from the tip end of the bush cutter 18, shown in FIG. 7, and the blower portion 4 is attached to the tip end instead of the cutter 13, the length between the tip end of the bush cutter 18 and the engine 7 is as long as about 1500 mm, and the weight is concentrated at the tip end, so that the tip end of the bush cutter 18 is lowered and approaches near the surface of the ground and that the ability of the blower portion 4 is limited when the blower portion 4 is attached to the tip end of the bush cutter instead of the cutter 13. Many obstacles, such as gravel or the like exist on the surface of the ground, so that the blower portion 4 must be limited in size and ability.

SUMMARY OF THE INVENTION

An object of the present invention is to provide a blower, free from the above defects.

Another object of the present invention is to provide a blower comprising an engine to be carried on the back, a blower portion having a holding member and a fan, and a flexible shaft, one end of which is connected to an output shaft of said engine and the other end of which is connected to a rotary shaft of said fan.

A further object of the present invention is to provide a blower, wherein the flexible shaft comprises a flexible outer tube for connecting a casing of said engine with a housing of said fan, and a rotary shaft formed of a helical coil rounded helically around the axial line of said outer tube and extending axially in said outer tube, one end of the rotary shaft of the flexible shaft being connected to the output shaft of said engine and the other end of the rotary shaft of the flexible shaft being connected to the rotary shaft of said fan.

Yet a further object of the present invention is to provide a blower, wherein the other end of said rotary shaft is connected to said rotary shaft of said fan through a power transmitting direction varying device.

Yet another object of the present invention is to provide a blower, wherein the power transmitting direction varying device comprises two bevel gears meshed with each other for varying the power transmitting direction.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DETAILED DESCRIPTION OF THE PREFERRED EMBODIMENTS

Figure 1:
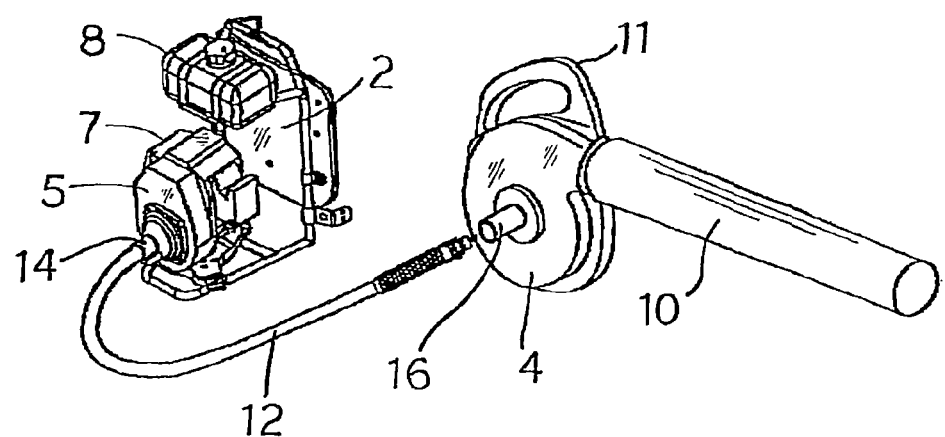
FIG. 1 is a perspective view of a blower of an embodiment according to the present invention.

An embodiment 1 of a blower according to the present invention will now be explained with reference to FIG. 1 to FIG. 3.

Figure 5:
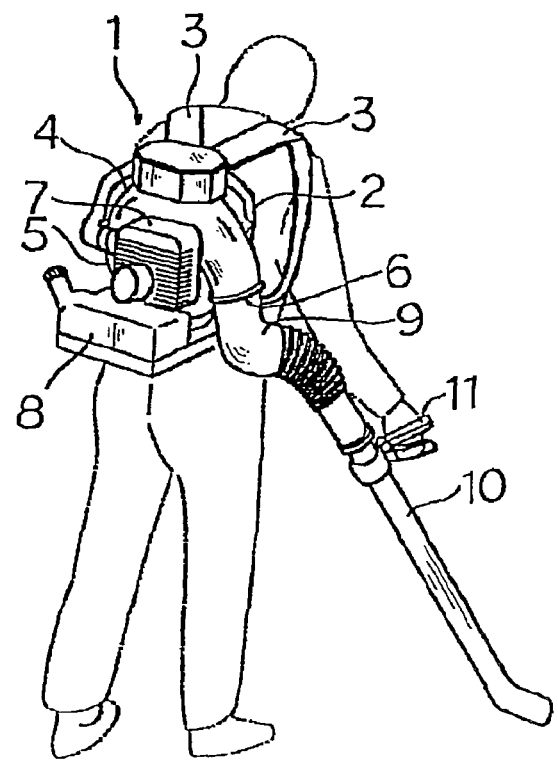
FIG. 5 is an explanatory view of a conventional blower to be carried on the back.
Figure 6:
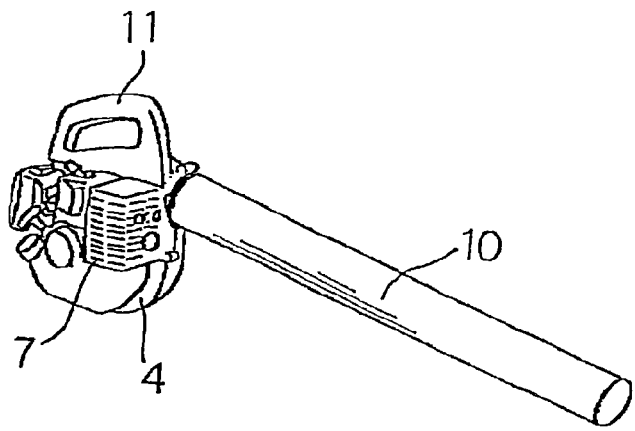
FIG. 6 is an explanatory view of a conventional hand type blower.
Figure 7:
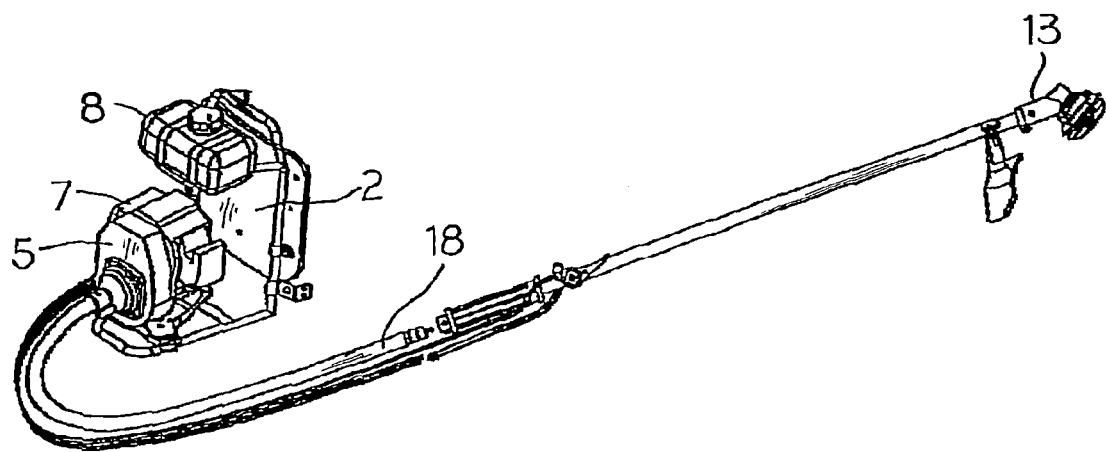
FIG. 7 is an explanatory view of a conventional attachment type bush cutter.

Parts of the blower which are similar to corresponding parts of the blower shown in FIG. 5 to FIG. 7 have been given corresponding reference numbers and need not be further redescribed.

In an embodiment of a blower of the present invention, an engine 7 for driving a blower portion 4 is mounted on an L-shaped shoulder member 2 to be carried on the back, the blower portion 4 is held through a handle 11 by hand, and a flexible shaft 12 is used.

Figure 3:
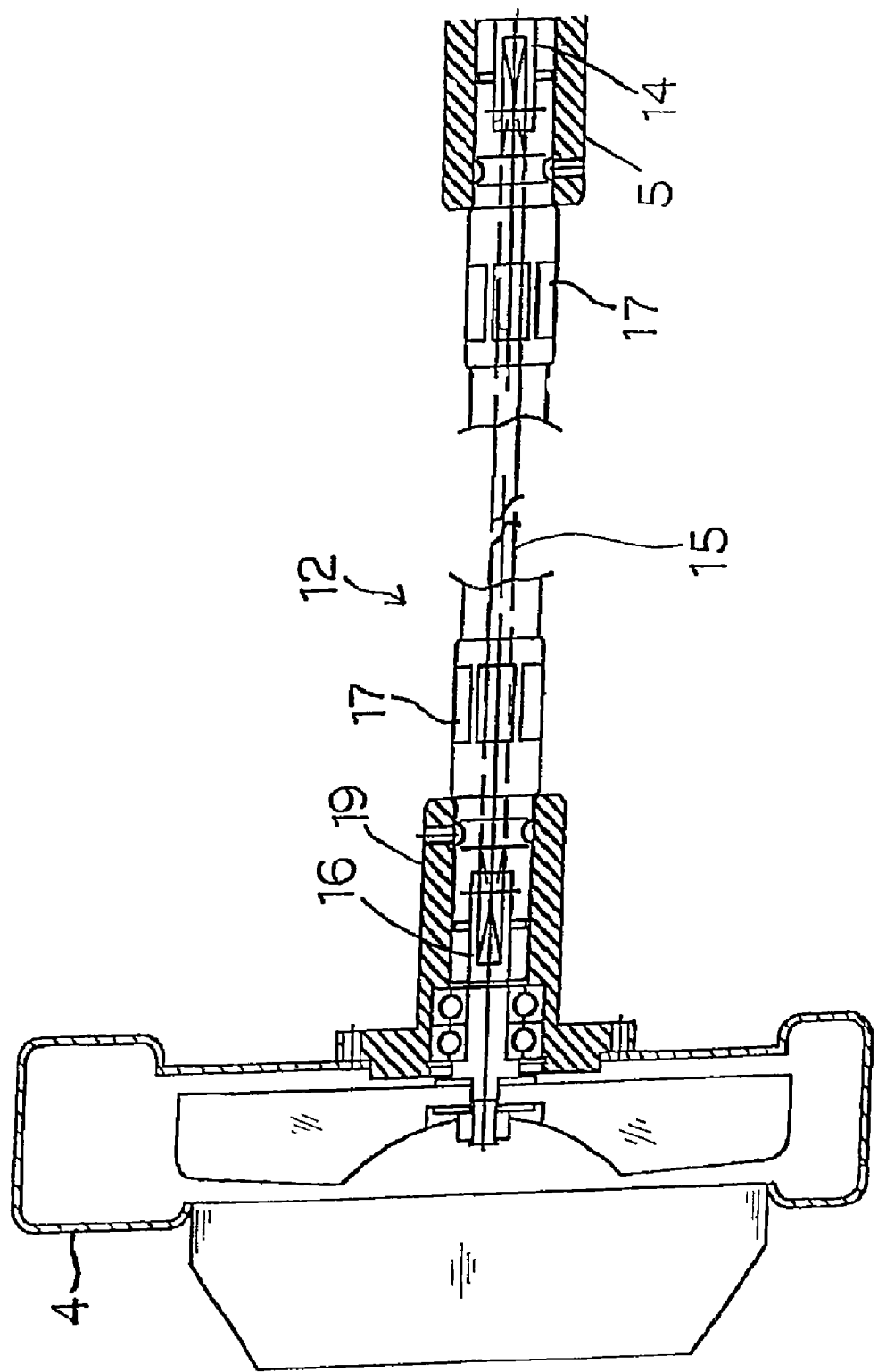
FIG. 3 is a sectional view of a flexible shaft of the blower shown in FIG. 1.

As shown in FIG. 3, the flexible shaft 12 comprises a flexible outer tube 17 for connecting a casing 5 of the engine 7 with a housing 19 of the blower portion 4, and a rotary shaft 15 rotated in the outer tube 17, the rotary shaft 15 being formed of a helical coil rounded helically around the axis of the outer tube 17 and extending axially, one end of the rotary shaft 15 being connected to an output shaft 14 of the engine 7, and the other end of the rotary shaft 15 being connected to a fan rotary shaft 16.

Figure 2:
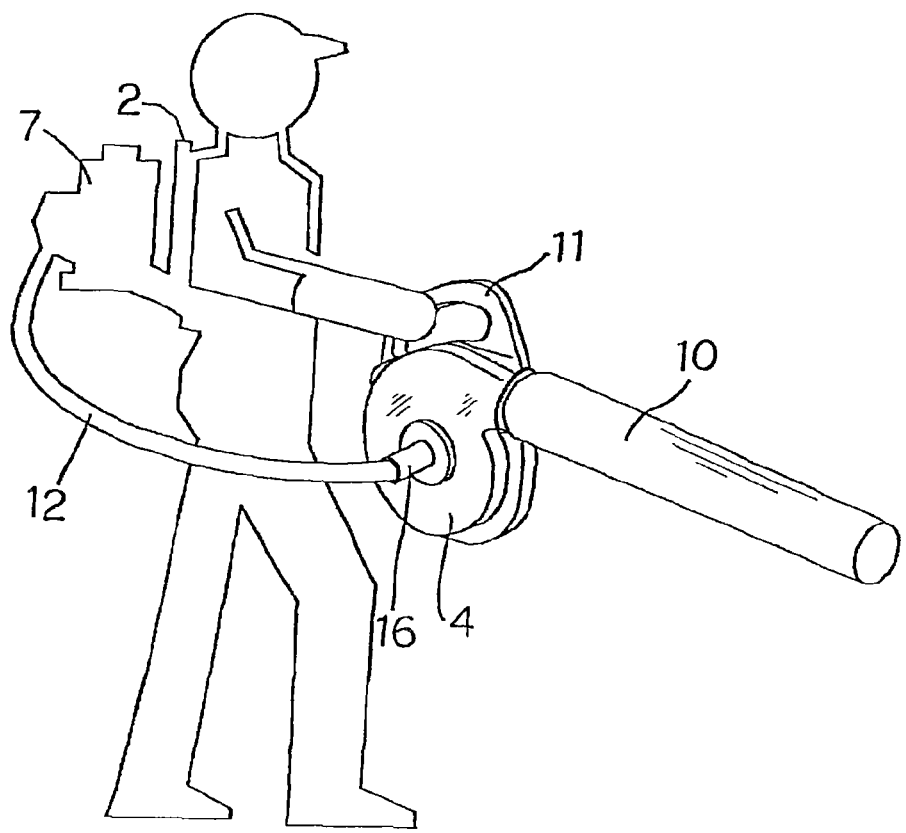
FIG. 2 is an explanatory view of use of the blower shown in FIG. 1.

An embodiment of a blower of the present invention is used as shown in FIG. 2. That is, only the engine 7 is carried on the back through the L-shaped shoulder member 2, and the blower portion 4 is held by hand through the handle 11, so that the limitation in weight of the blower portion 4 can be reduced, and so that a large engine can be utilized.

Another embodiment 2 of the present invention will be explained.

Figure 4:
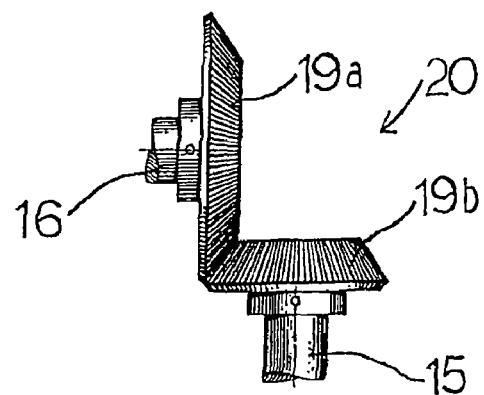
FIG. 4 is an explanatory view of a power transmitting direction varying device of a blower of another embodiment according to the present invention.

In the embodiment 2, the other end of the rotary shaft 15 of the flexible shaft 12 is connected to the fan rotary shaft 16 of the blower portion 4 through a power transmitting direction varying device 20 composed of two bevel gears 19a and 19b meshed with each other for varying the power transmitting direction, as shown in FIG. 4.

According to the embodiment 2 of the present invention, the power transmitting direction can be varied normally for example, without bending the flexible shaft 12, so that over load is not exerted on the flexible shaft 12.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A blower comprising an engine with a shoulder member for carrying the engine on the back of an operator, a blower portion having a holding member and a fan, and a flexible shaft, one end of which is connected to an output shaft of said engine and the other end of which is connected to a rotary shaft of said fan through a power transmitting direction varying device comprising two bevel gears meshed with each other for varying the power transmitting direction, wherein the flexible shaft comprises a flexible outer tube for connecting a casing of said engine with a housing of said fan, and a rotary shaft formed of a helical coil rounded helically around the axial line of said outer tube and extending axially in said outer tube, one end of the rotary shaft of the flexible shaft being connected to the output shaft of said engine and the other end of the rotary shaft of the flexible shaft being connected to the rotary shaft of said fan.

* * * * *